United States Patent
Miyairi

(10) Patent No.: US 8,721,978 B2
(45) Date of Patent: May 13, 2014

(54) CATALYST CARRIER

(75) Inventor: Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 558 days.

(21) Appl. No.: 12/137,238

(22) Filed: Jun. 11, 2008

(65) Prior Publication Data

US 2008/0292513 A1    Nov. 27, 2008

Related U.S. Application Data

(63) Continuation of application No. PCT/JP2006/324285, filed on Dec. 5, 2006.

(30) Foreign Application Priority Data

Dec. 16, 2005   (JP) ................................. 2005-363591

(51) Int. Cl.
*B01D 50/00* (2006.01)
(52) U.S. Cl.
USPC .......................................... 422/180; 422/177
(58) Field of Classification Search
CPC . F01N 3/2828; F01N 2330/06; B01J 23/8993
USPC .............. 422/168, 177, 180; 55/523; 502/174
See application file for complete search history.

(56) References Cited

U.S. PATENT DOCUMENTS

| | | | |
|---|---|---|---|
| 7,348,289 B2 * | 3/2008 | Ichikawa et al. ............. | 502/174 |
| 2004/0166035 A1 | 8/2004 | Noda et al. | |
| 2006/0068159 A1* | 3/2006 | Komori et al. ............... | 428/116 |
| 2006/0210765 A1 | 9/2006 | Ohno et al. | |

FOREIGN PATENT DOCUMENTS

| | | |
|---|---|---|
| CN | 1412518 A | 4/2003 |
| EP | 0 592 667 A1 | 4/1994 |
| EP | 1491249 A1 * | 12/2004 |
| EP | 1 676 622 A1 | 7/2006 |
| JP | A 04-052252 | 2/1992 |
| JP | A 2003-033664 | 2/2003 |
| JP | A 2004-156621 | 6/2004 |
| JP | A 2006-255574 | 9/2006 |
| WO | WO 01/49441 A1 | 7/2001 |
| WO | WO 02/20197 A1 | 3/2002 |

OTHER PUBLICATIONS

The Chemical Society of Japan, "Kagaku Binran Kisohen," Maruzen Co., Ltd., 1966, p. 755.
Japanese Office Action issued Jul. 3, 2012 in Application No. JP-A-2007-550140 with English translation.
Nov. 22, 2011 European Search Report issued in EP 06 83 4040.5.
Wei et al., "Mesoporous Activated Alumina Layers Deposited on FeCrAl Metallic Substrates by an In Situ Hydrothermal Method," 2005, pp. 283-287, vol. 396, Journal of Alloys and Compounds, Elsevier.
Jan. 20, 2014 Office Action issued in European Patent Application No. 06 834 040 5.

* cited by examiner

*Primary Examiner* — Tom Duong
(74) *Attorney, Agent, or Firm* — Oliff PLC

(57) ABSTRACT

Disclosed is a catalyst carrier which is used for carrying a catalyst thereon. The catalyst carrier is characterized in that the apparent specific heat measured at 800° C. is 1.8 times or more greater than that measured at room temperature, wherein the apparent specific heat means a charge heat amount required for substantially increasing the temperature of a unit mass (kg) by 1 K, inclusive of the influence of endotherm or exotherm caused by change in crystalline form, partial melting, coagulation, phase transformation, vitrification, amorphous-formation, crystallization and the like.

16 Claims, 5 Drawing Sheets

CATALYST CARRIER

TECHNICAL FIELD

The present invention relates to a catalyst carrier. More particularly, it relates to a catalyst carrier in which a temperature is easily raised at a low temperature and which has an excellent light-off characteristic and in which the temperature is not easily raised at a high temperature and in which a maximum temperature can be minimized, whereby deterioration due to the heat of a carried catalyst can be suppressed.

BACKGROUND ART

A catalytic converter which carries a catalyst for purification on a catalyst carrier is used in order to purify components to be purified, for example, carbon monoxide (CO), hydrocarbon (HC), nitrogen oxide ($NO_x$), sulfur oxide ($SO_x$) and the like included in an exhaust gas discharged from stationary engines for a car, a construction machine and an industry, a combustion device and the like. As such a catalytic converter, there is used a catalytic converter having a structure in which as shown in, for example, FIG. 8, a catalyst layer 15 is carried on the surfaces of partition walls 4 forming cells 3 in a honeycomb structure. Moreover, as shown in FIGS. 9, 10, it is disclosed that in a case where the exhaust gas is purified using this catalytic converter 60, the exhaust gas is allowed to flow into the cell 3 of the catalytic converter 60 from the side of one end face 2a, and the exhaust gas is brought into contact with the catalyst layer (not shown) on the surfaces of the partition walls 4, and then discharged from the structure from the side of the other end face 2b (e.g., see Patent Document 1).

JP 2003-33664 A

DISCLOSURE OF THE INVENTION

However, in a case where an exhaust gas is purified using a catalytic converter disclosed in Patent Document 1, to improve the light-off characteristic (a property capable of quickly achieving a catalyst activity temperature at a low temperature) of the catalytic converter, a catalyst carrier having a high OFA (opening ratio) has been used, but a temperature rise property is excessively excellent. Therefore, on high load (high temperature, high flow rate) conditions, the catalyst carrier temperature becomes excessively high, which causes a problem that the carried catalyst deteriorates.

The present invention has been developed in view of the above problem of a conventional technology, and an objective thereof is to provide a catalyst carrier in which a temperature is easily raised at a low temperature and which has an excellent light-off characteristic and in which the temperature is not easily raised at a high temperature and in which a maximum temperature can be minimized, whereby deterioration due to the heat of a carried catalyst can be suppressed.

To achieve the above objective, according to the present invention, the following catalyst carrier is provided.

[1] A catalyst carrier which is used for carrying a catalyst thereon, characterized in that the apparent specific heat measured at 800° C. and defined as follows is 1.8 times or more greater than that measured at room temperature, wherein the apparent specific heat means a charge heat amount required for substantially increasing the temperature of a unit mass (Kg) by 1 K, inclusive of the influence of endotherm or exotherm caused by change in crystalline form, partial melting, coagulation, phase transformation, vitrification, amorphous-formation, crystallization and the like.

[2] The catalyst carrier according to [1], wherein the apparent specific heat at 900° C. is 1.8 times or more greater than that at 200° C.

[3] The catalyst carrier according to [1] or [2], wherein the apparent specific heat at room temperature is 500 J/kgK or more and is less than 900 J/kgK.

[4] The catalyst carrier according to any one of [1] to [3], which comprises a honeycomb structure having porous partition walls arranged so that a plurality of cells forming the channels of an exhaust gas are formed between two end faces.

[5] The catalyst carrier according to [4], wherein the honeycomb structure has an opening ratio (the ratio of the opening area of a plurality of cell holes with respect to a sectional area vertical to an axial direction) of 0.8 or more.

[6] The catalyst carrier according to [4] or [5], wherein the honeycomb structure further has plugging portions arranged so as to alternately plug one of opening end portions of the cells in the two end faces.

[7] The catalyst carrier according to any one of [4] to [6], wherein the honeycomb structure is a cordierite honeycomb structure made of cordierite, the catalyst carrier comprising: the cordierite honeycomb structure; and a coating material layer with which the cordierite honeycomb structure is coated at a ratio of 50 g/l or more and in which specific heat at 900° C. is twice or more greater than that at room temperature.

[8] The catalyst carrier according to any one of [4] to [6], wherein the honeycomb structure is a cordierite honeycomb structure made of cordierite, the catalyst carrier comprising: the cordierite honeycomb structure; and a layer (a first alloy layer) which is physically or chemically bonded and held in a dispersed state on the surfaces of the partition walls of the cells constituting the cordierite honeycomb structure or in pores and which is constituted of a first alloy containing a main component of zirconium (Zr), 1 to 1.5 mass % of tin (Sn), 0 to 0.2 mass % of iron (Fe), 0 to 0.2 mass % of chromium (Cr), 0 to 1 mass % of nickel (Ni) and further 0 to 0.02 mass % of oxygen ($O_2$).

[9] The catalyst carrier according to any one of [1] to [6], which is constituted of a second alloy containing 17 to 20 mass % of chromium (Cr), 5 to 6 mass % of aluminum (Al), 0.4 to 0.6 mass % of titanium (Ti), 0.4 to 0.6 mass % of yttrium trioxide ($Y_2O_3$) and a remainder including iron (Fe) and a slight amount of impurities.

[10] A catalytic converter in which a catalyst is carried on the catalyst carrier according to any one of [1] to [9].

[11] An exhaust gas processing system in which the catalytic converter according to [10] is used.

According to the present invention there is disclosed a catalyst carrier in which a temperature is easily raised at a low temperature and which has an excellent light-off characteristic and in which the temperature is not easily raised at a high temperature and in which a maximum temperature can be minimized, whereby deterioration due to the heat of a carried catalyst can be suppressed.

DESCRIPTION OF REFERENCE NUMERALS

1: honeycomb structure, 1a: cordierite honeycomb structure, 2a: end face, 2b: end face, 3: cell, 3a: cordierite honeycomb structure cell, 4: partition wall, 4a: cordierite honeycomb structure cell partition wall, 5: catalyst layer, 6: coating material layer, 7: first alloy layer, 10: plugging portion, 15: catalyst layer, 11: honeycomb structure, 20: outer wall, 21: honeycomb structure, 25: pore, 31: honeycomb structure, 35: catalyst-layer-carrying pore, 41: honeycomb structure, 50: catalytic converter, 50a: catalytic converter, 60: catalytic converter

BEST MODE FOR CARRYING OUT THE INVENTION

The best mode for carrying out the present invention will hereinafter be described, but it should be understood that the present invention should not be limited to the following embodiment and that the following embodiment is appropriately modified or improved based on the knowledge of any person skilled in the art within the scope of the present invention.

The best mode for carrying out the present invention will hereinafter specifically be described with reference to the drawings.

Figure 1:
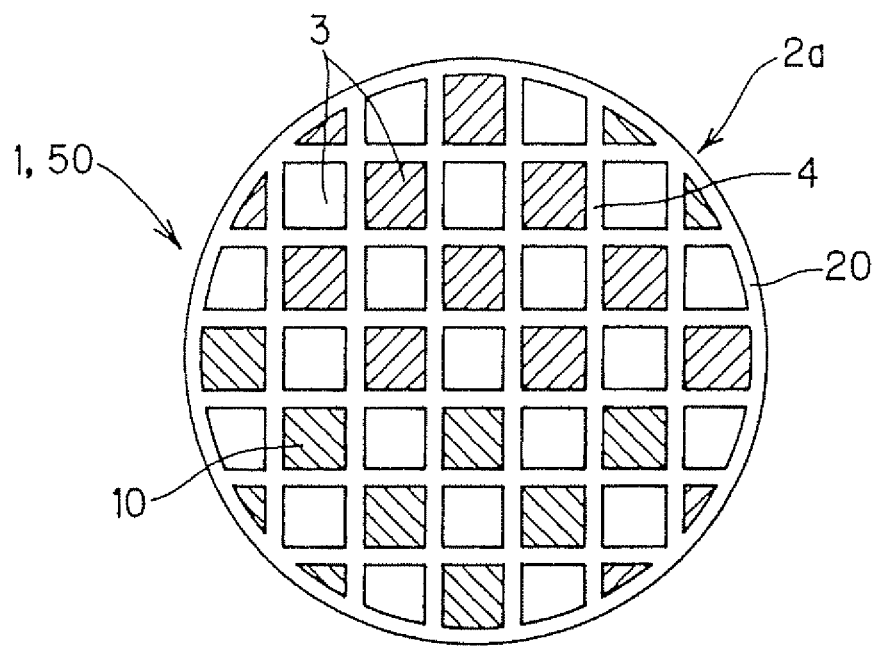
FIG. 1 is an explanatory view schematically showing one embodiment of a honeycomb structure and a catalytic converter according to the present invention.
Figure 2:
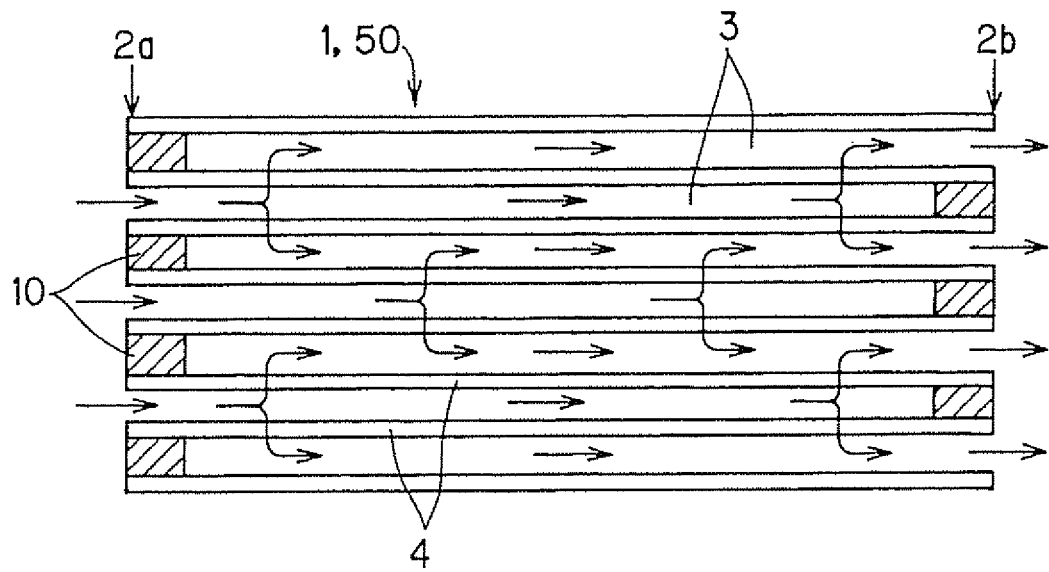
FIG. 2 is a sectional view showing the honeycomb structure and the catalytic converter shown in FIG. 1.
Figure 3:
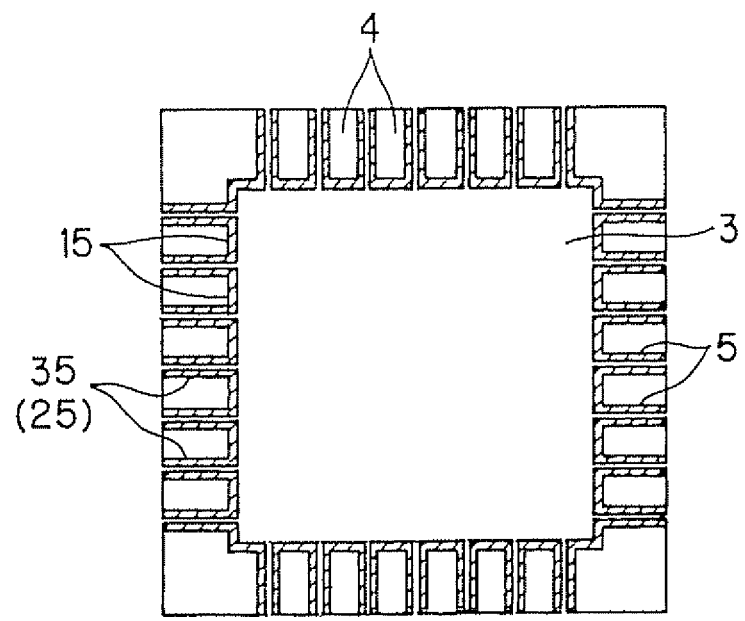
FIG. 3 is a partially enlarged view showing an enlarged part of the honeycomb structure and the catalytic converter shown in FIG. 1.

FIG. 1 is an explanatory view schematically showing one embodiment of a catalyst carrier (a honeycomb structure as a specific configuration) and a catalytic converter according to the present invention. FIG. 2 is a sectional view showing the catalyst carrier (the honeycomb structure as the specific configuration) and the catalytic converter shown in FIG. 1. FIG. 3 is a partially enlarged view showing an enlarged part of the catalyst carrier (the honeycomb structure as the specific configuration) and the catalytic converter shown in FIG. 1.

A catalyst carrier according to the present invention is a catalyst carrier which is use in carrying a catalyst, characterized in that the apparent specific heat measured at 800° C. and defined as follows is 1.8 times or more, preferably 2.5 times or more greater than that measured at room temperature.

The apparent specific heat means a charge heat amount required for substantially increasing the temperature of a unit mass (kg) by 1 K, inclusive of the influence of endotherm or exotherm caused by change in crystalline form, partial melting, coagulation, phase transformation, vitrification, amorphous-formation, crystallization and the like.

In a case where the apparent specific heat at 800° C. is below 1.8 times that at room temperature, when a carrier weight is set to a small weight in order to improve a temperature rise property during starting at a low temperature, the carrier temperature becomes excessively high during an operation at a high temperature and with a high load, and catalyst deterioration is caused, whereby the deterioration due to the heat of a carried catalyst is insufficiently suppressed.

To obtain such a constitution, the examples of a carrier material itself include a material involving endotherm caused by temperature rise due to the change of a is crystal phase at a temperature in the vicinity of 800° C.; a material which has a melting point in the vicinity of 800° C. as one component of a composite material and which absorbs melting heat with the temperature rise of the carrier at the temperature in the vicinity of 800° C.; and a material in which most general cordierite ceramic is used as a carrier base, whereby the above substances are attached to the surface of the cordierite material and the inner portions of the pores.

In the present invention, the apparent specific heat at 900° C. is preferably 1.8 times or more, further preferably 2.5 times or more greater than that at 200° C. In a case where the apparent specific heat at 900° C. is below 1.8 times that at 200° C., when the carrier weight is set to the small weight in order to improve the temperature rise property during the starting at the low temperature, the carrier temperature becomes excessively high during the operation at the high temperature and with the high load, and the catalyst deterioration is caused, whereby the deterioration due to the heat of the carried catalyst is insufficiently suppressed.

To obtain such a constitution, the examples of a carrier material itself include the material involving the endotherm caused by the temperature rise due to the change of the crystal phase at the temperature in the vicinity of 800° C.; a material which has a melting point in the vicinity of 900° C. as one component of a composite material and which absorbs the melting heat with the temperature rise of the carrier at the temperature in the vicinity of 900° C.; and the material in which most general cordierite ceramic is used as the carrier base, whereby these substances are attached to the surface of the cordierite material and the inner portions of the pores.

In the present invention, the apparent specific heat at room temperature is preferably 500 J/kgK or more and less than 900 J/kgK, and the apparent specific heat at room temperature is further preferably 500 J/kgK or more and less than 700 J/kgK. When the apparent specific heat at room temperature is less than 500 J/kgK, the temperature becomes excessively high during the operation at the high temperature and with the high load to cause the catalyst deterioration. When the apparent specific heat is 900 J/kgK or more, the light-off characteristic during the starting at a low temperature lowers, whereby the deterioration due to the heat of the carried catalyst is sometimes insufficiently suppressed.

To obtain such a constitution, for example, using cordierite as a carrier base and an alloy containing zirconium as a main component, or an alloy containing iron, aluminum and chromium as main components is attached to the surface of the cordierite material or the inner portions of the pores. Alternatively, an alloy containing zirconium as a main component, or the alloy containing iron, aluminum and chromium as the main components is used as the base material of the carrier, and the ratio of these components is appropriately adjusted.

There is not any special restriction on the shape, structure or material of the catalyst carrier according to the present invention, but the examples of the catalyst carrier include a honeycomb structure, ceramic foam, metal foam, ceramic pellets and metal pellets. Above all, the honeycomb structure is preferable.

Figure 8:
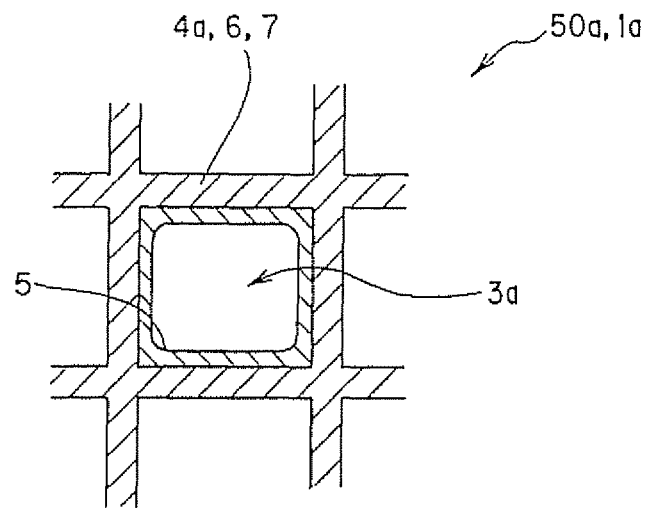
FIG. 8 is a partially enlarged view schematically showing one example of a conventional catalytic converter.
Figure 9:
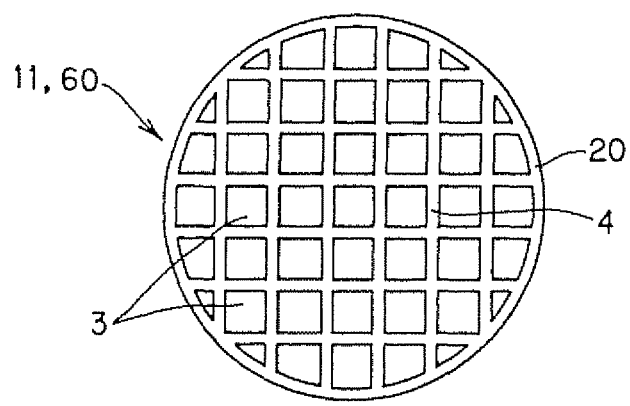
FIG. 9 is a front view schematically showing one example of a conventional catalytic converter honeycomb structure, and the catalytic converter.
Figure 10:
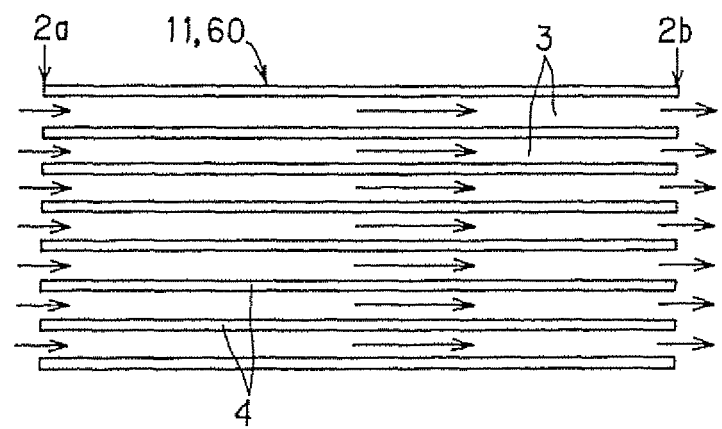
FIG. 10 is a sectional view schematically showing one example of the conventional honeycomb structure and catalytic converter.

The catalyst carrier of the present invention will hereinafter specifically be described in accordance with the example of the honeycomb structure as the specific configuration of the catalyst carrier. The honeycomb structure of the present embodiment is based on a cell structure shown in FIGS. 8 to 10. As shown in FIGS. 1 to 3, the structure may have a constitution including porous partition walls 4 arranged so as to form a plurality of cells 3 which connect two end faces 2a, 2b to each other and having a large number of pores 25 (see FIG. 3), and plugging portions 10 arranged so as to alternately plug one of the end portions of the cells 3 in the two end faces 2a, 2b.

In the present embodiment, the opening ratio (the ratio occupied by the opening areas of a plurality of cell holes in a sectional area vertical to an axial direction) of a honeycomb structure 1 is preferably 0.8 or more, further preferably 0.35 or more. When the opening ratio is less than 0.8, a thermal capacity at room temperature is excessively large, so that a light-off characteristic sometimes lowers.

In the present embodiment, the preferable examples of a material constituting the honeycomb structure 1 include a material containing a ceramic as a main component, and a sintered metal. Specifically, when the structure is constituted of the material containing the ceramic as the main component, the preferable examples of the ceramic include silicon carbide, cordierite, alumina titanate, sialon, mullite, silicon nitride, zirconium phosphate, zirconia, titania, alumina, silica and a combination thereof. In particular, a ceramic such as silicon carbide, cordierite, mullite, silicon nitride or alumina is preferable from a viewpoint of alkali resistance. Above all, an oxide-based ceramic is preferable even from a viewpoint of cost.

Figure 4:
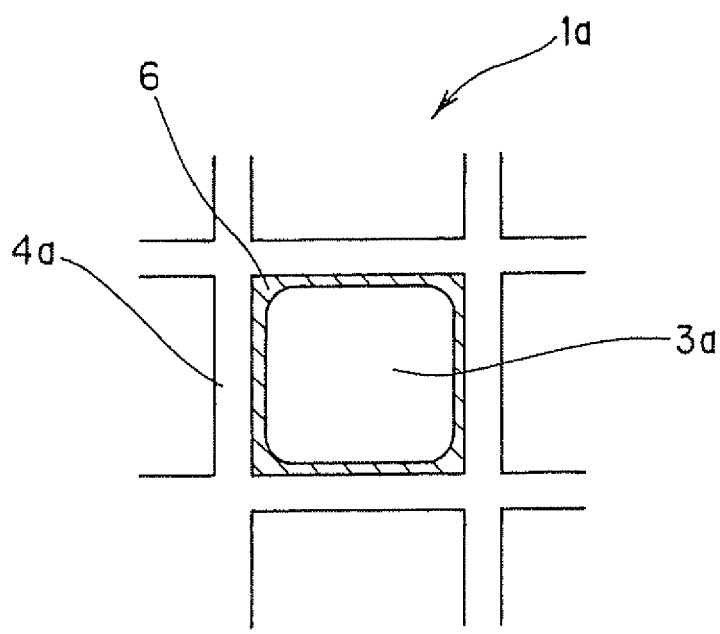
FIG. 4 is an explanatory view schematically showing another embodiment (a cordierite honeycomb structure coated with a coating material layer) of the honeycomb structure according to the present invention.

As shown in FIG. 4, as another embodiment of the present invention, the honeycomb structure 1 is a cordierite honeycomb structure 1a made of cordierite. The embodiment includes the cordierite honeycomb structure 1a, and a coating material layer 6 with which the cordierite honeycomb structure 1a is coated at a ratio of 50 g/l or more and in which specific heat at 900° C. is twice or more that at room temperature. The embodiment preferably includes the cordierite honeycomb structure 1a, and the coating material layer 6 with which the cordierite honeycomb structure 1a is coated at a ratio of 50 g/l or more and in which the specific heat at 900° C. is twice or more that at room temperature. In a case where the coating ratio of the coating material layer 6 with respect to the cordierite honeycomb structure 1a is less than 50 g/l, the thermal capacity at a high temperature sometimes insufficiently increases. Moreover, even when the specific heat of the coating material layer 6 at 900° C. is less than twice that thereof at room temperature, the thermal capacity at the high temperature sometimes insufficiently increases.

The examples of the coating material layer 6 for use in the present embodiment include layers made of a zirconium alloy, iron, aluminum, a chromium alloy, silicon nitride, silicon carbide, zirconia and titania. Moreover, the examples of a method for coating the cordierite honeycomb structure 1a with the coating material layer 6 include a method of dispersing the material in an organic solvent or an inorganic solvent to form the material into a slurry state and apply the material.

Figure 5A:
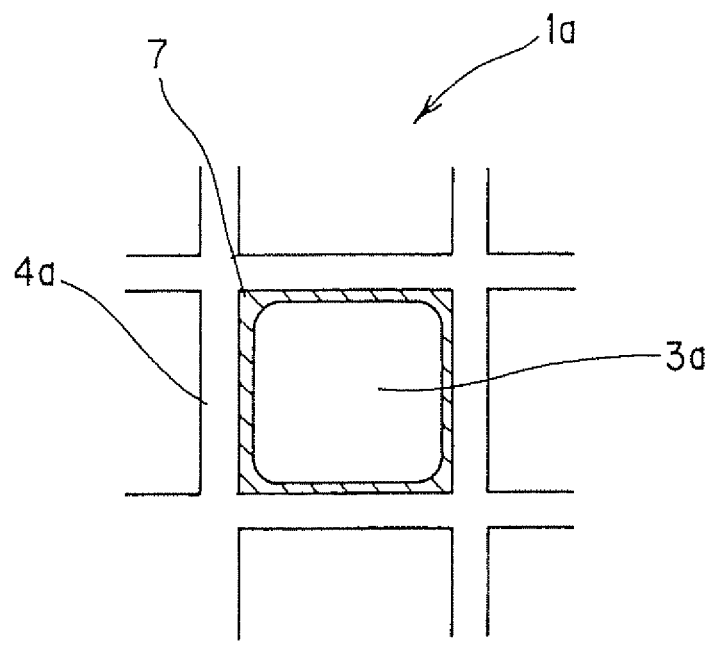
FIG. 5(a) is an explanatory view schematically showing a case where a first alloy layer is held on the surfaces of cell partition walls in still another embodiment (a cordierite honeycomb structure including the first alloy layer) of the honeycomb structure according to the present invention.
Figure 5B:
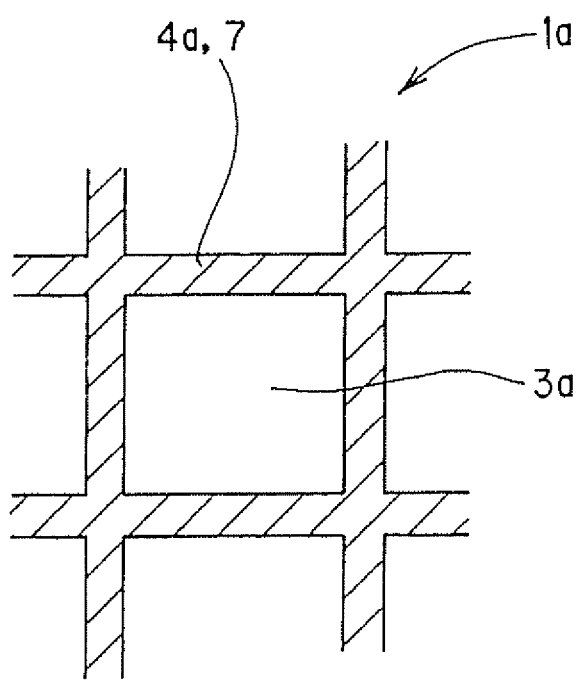
FIG. 5(b) is an explanatory view schematically showing a case where the first alloy layer is held in the pores of the cell partition walls in the other embodiment (the cordierite honeycomb structure including the first alloy layer) of the honeycomb structure according to the present invention.

As shown in FIGS. 5(a) and 5(b), as still another embodiment of the present invention, the honeycomb structure 1 is a cordierite honeycomb structure 1a made of cordierite, and the embodiment includes the cordierite honeycomb structure 1a, and a layer (a first alloy layer) 7 which is physically or chemically bonded and held in a dispersed state on the surfaces (see FIG. 5(a)) of partition walls 4a of cells 3a constituting the cordierite honeycomb structure 1a or in pores (see FIG. 5(b)) and which is constituted of a first alloy containing a main component of zirconium (Zr), 1 to 1.5 mass % of tin (Sn), 0 to 0.2 mass % of iron (Fe), 0 to 0.2 mass % of chromium (Cr), 0 to 1 mass % of nickel (Ni) and further 0 to 0.02 mass % of oxygen ($O_2$). According to such a constitution, the thermal capacity at 800° C. can be twice or more that at room temperature, whereby deterioration due to the heat of a carried catalyst can be suppressed.

A still further embodiment according to the present invention is constituted of, for example, a second alloy containing 17 to 20 mass % of chromium (Cr), 5 to 6 mass % of aluminum (Al), 0.4 to 0.6 mass % of titanium (Ti), further 0.4 to 0.6 mass % of yttrium trioxide ($Y_2O_3$) and a remainder including iron (Fe) and a slight amount of impurities. According to such a constitution, the thermal capacity at 800° C. can be twice or more that at room temperature, whereby deterioration due to the heat of a carried catalyst can be suppressed.

Moreover, in the honeycomb structure 1 of the above embodiment, the shape of a section cut along a plane vertical to a cell communicating direction is preferably a shape suitable for the inner shape of an exhaust system to be installed. The specific examples of the shape include a circle, an ellipse, an oblong, a trapezoidal shape, a triangular shape, a quadrangular shape, a hexagonal shape and a horizontally asymmetric irregular shape. Above all, the circle, the ellipse or the oblong is preferable.

The honeycomb structure of the above embodiment can be manufactured in conformity to the manufacturing method of a heretofore known diesel particulate filter (DPF).

Next, one embodiment of a catalytic converter according to the present invention will be described. In a catalytic converter 50 (see FIGS. 1 to 3) according to the present embodiment, a catalyst is carried by the honeycomb structure 1 shown in FIGS. 1 to 3.

FIG. 3 shows the catalytic converter including the honeycomb structure 1 and a catalyst layer 5 containing the catalyst. The catalyst layer 5 is carried in a layer-like form on the inner surface of each pore 25 of the partition wall 4 of the cell 3 in the honeycomb structure 1, and a large number of catalyst carrying pores 35 are formed in the partition walls 4. It is to be noted that the catalyst carrying pores 35 connect the adjacent cells 3 to each other. The catalyst layer 15 may be formed on the inner surface of the cell 3 excluding the catalyst carrying pores 35.

Next, another embodiment of the catalytic converter according to the present invention will be described. In a catalytic converter 50a (see FIGS. 6, 7) according to the present embodiment, a catalyst is carried by the cordierite honeycomb structure 1a shown in FIGS. 4, 5.

Figure 6:
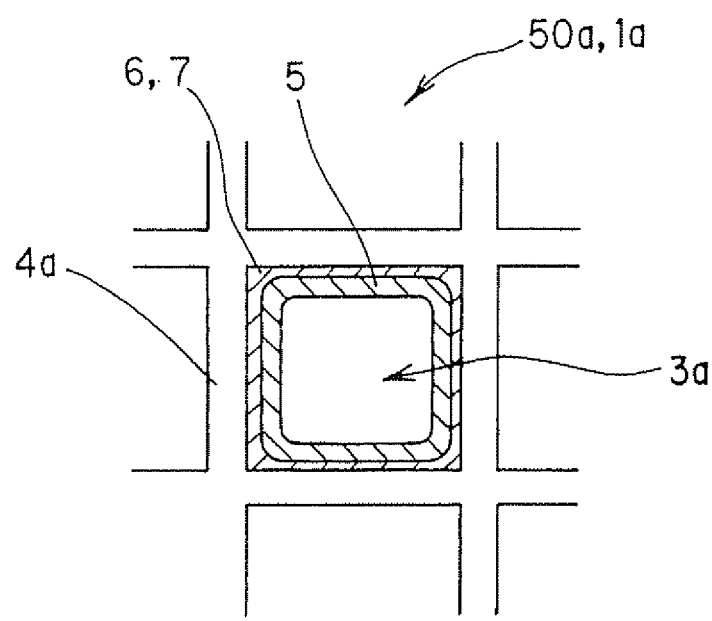
FIG. 6 is an explanatory view schematically showing a further embodiment of a catalytic converter according to the present invention.

FIG. 6 shows a catalytic converter 50a including a cordierite honeycomb structure 1a, a coating material layer 6 or a first alloy layer 7 formed in a layer-like shape on the inner surfaces of partition walls 4a of cells 3a excluding catalyst carrying pores 35 (pores 25) in the cordierite honeycomb structure 1a, and a catalyst layer 5 carried and formed in a layer-like shape on the coating material layer 6 or the first alloy layer 7.

Figure 7:
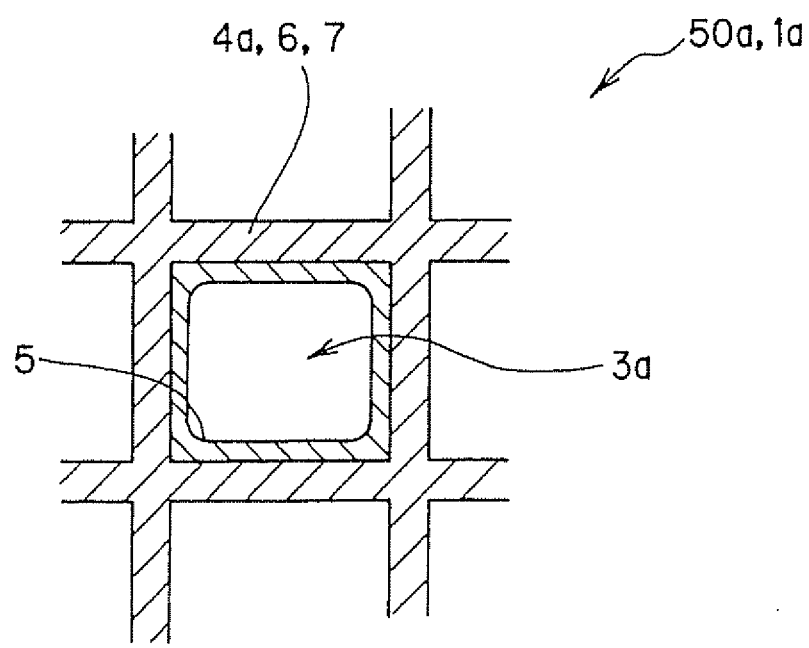
FIG. 7 is an explanatory view schematically showing a still further embodiment of the catalytic converter according to the present invention.

FIG. 7 shows a catalytic converter 50a including a cordierite honeycomb structure 1a, a coating material layer 6 or a first alloy layer 7 formed in a layer-like shape in catalyst carrying pores 35 (pores 25) of partition walls 4a of cells 3a in the cordierite honeycomb structure 1a, and a catalyst layer 5 carried and formed in a layer-like shape on the coating material layer 6 or the first alloy layer 7.

As described above, with regard to the partition walls 4 of the honeycomb structure 1 in the catalytic converter 50 of the present embodiment in which the catalyst layer 5 is carried by the inner surfaces of the pores 25 of the honeycomb structure 1, fine carbon particles and the like included in an exhaust gas discharged from a diesel engine are not easily trapped by the partition walls 4, and a greater part of the particles passes through the partition walls (this also applies to the catalytic converter 50a including the cordierite honeycomb structure 1a and the coating material layer 6 or the first alloy layer 7). That is, as shown in FIG. 2, the exhaust gas which has flowed into the cell 3 of the catalytic converter 50 from the side of one end face 2a passes through the partition wall 4 to move to the adjacent cell 3, and is then discharged from the structure on the side of the other end face 2b. Therefore, the catalytic converter 50 of the present embodiment has a small pressure loss, and the pressure loss does not easily increase even in a case where the converter is used for a long period.

The catalytic converter 50 or 50a of the present embodiment preferably satisfies the above-mentioned conditions of the apparent specific heat even in a state in which the honeycomb structure 1 or 1a carries the catalyst. According to such a constitution, the above effect can sufficiently be exerted.

The specific examples of the catalyst contained in the catalyst layer 5 constituting the honeycomb catalyst 50 of the present embodiment include (1) a gasoline engine exhaust gas purifying three-way catalyst, (2) a gasoline or diesel engine exhaust gas purifying oxidation catalyst, (3) an SCR catalyst for $NO_x$ selective reduction, and (4) an $NO_x$ occluded catalyst.

The gasoline engine exhaust gas purifying three-way catalyst includes a carrier coat which covers the partition walls of the honeycomb structure (a honeycomb carrier), and a noble metal dispersed and carried in this carrier coat. The carrier coat is made of, for example, activated alumina. The preferable examples of the noble metal to be dispersed and carried in the carrier coat include Pt, Rh, Pd, and a combination thereof. Furthermore, the carrier coat contains a compound such as cerium oxide, zirconia oxide or silica, or a mixture obtained by combining them. It is to be noted that the total amount of the noble metal is preferably 0.17 to 7.07 g per volume of one liter of the honeycomb structure.

The oxidation catalyst for the purification of the gasoline or diesel engine exhaust gas contains a noble metal. As this noble metal, one or more selected from the group consisting of Pt, Rh and Pd is preferable. It is to be noted that the total amount of the noble metal is preferably 0.17 to 7.07 g per volume of one liter of the honeycomb structure. The SCR catalyst for $NO_x$ selective reduction contains at least one selected from the group consisting of metal replacing zeolite, vanadium, titania, tungsten oxide, silver and alumina.

The $NO_x$ occluded catalyst contains an alkali metal and/or an alkali earth metal. The examples of the alkali metal include K, Na and Li. The examples of the alkali earth metal include Ca. It is to be noted that the total amount of K, Na, Li and Ca is preferably 5 g or more per volume of one liter of the honeycomb structure.

The catalytic converter of the present invention can be manufactured by carrying the catalyst on the above-mentioned honeycomb structure by a manufacturing method in conformity to a heretofore known method. Specifically, first a catalyst-containing catalyst slurry is prepared. Subsequently, the surfaces of the pores of the partition walls of the honeycomb structure are coated with this catalyst slurry by a method such as a suction process. Afterward, the structure is dried on conditions of room temperature or under heating, whereby the catalytic converter of the present invention can be manufactured.

Moreover, the catalytic converter of the present embodiment can effectively be used in various exhaust gas processing system.

EXAMPLES

Example 1

An alloy containing a main component of Zr, 1% to 1.5% of Sn, 0 to 0.2% of Fe, 0 to 0.2% of Cr, 0 to 1% of Ni and 0 to 0.02% of $O_2$ was dispersed and held on the surfaces of cell partition walls of a cordierite honeycomb structure. An amount to be held was set so that a ratio of cordierite mass: alloy mass was 4:1. The alloy was dispersed and held as follows.

First, the cordierite honeycomb structure having a wall thickness of 2.5 mil (64 μm), a cell density of 400 cpsi (62 cells/cm²), a diameter of 105.7 mm and a length of 114.3 mm was prepared as a fired body by the existing manufacturing method.

As the alloy, particle-like shape (an average particle diameter of 2 μm and a configuration to be mixed in an alumina wash coat slurry were employed, and the cordierite honeycomb structure was coated with this slurry by a method similar to a usual alumina wash coat holding process. A thermal capacity changed owing to the phase transformation of this alloy, whereby the thermal capacity of the alloy increased as much as about five times at a temperature exceeding 930° C. Therefore, also owing to the increase of the thermal capacity due to the changes of cordierite and the alumina wash coat slurry itself from room temperature to 930° C., as the thermal capacity of the coated honeycomb structure, a value of 1600 J/kgK was obtained at 930° C., and this value was 2.3 times a value of 700 J/kgK at room temperature.

Any catalyst noble metal was not carried on an alumina coat layer including alloy particles, and a usual coat layer including a noble metal was further carried on this alumina coat layer to prepare a catalytic converter. The noble metal Pt:Rh was mixed in an alumina slurry at a mass ratio of 5:1 to coat the converter. The total amount of the noble metal was set to 3 g per honeycomb structure. The amount of the alumina coat layer including the noble metal was set to 150 g per honeycomb structure.

Example 2

An alloy containing a main component of Zr, 1% to 1.5% of Sn, 0 to 0.2% of Fe, 0 to 0.2% of Cr, 0 to 1% of Ni and 0 to 0.02% Of $O_2$ was dispersed and held in the pores of the cell partition walls of a cordierite honeycomb structure. An amount to be held was set so that a ratio of cordierite mass: alloy mass was 4:1. The alloy was dispersed and held as follows.

First the cordierite honeycomb structure having a wall thickness of 2.5 mil (64 μm), a cell density of 400 cpsi (62 cells/cm²), a diameter of 105.7 mm and a length of 114.3 mm was prepared as a fired body by the existing manufacturing method.

As the alloy, a particle-like shape (an average particle diameter of 2 μm), and a configuration to be mixed in an alumina wash coat slurry were employed, and the viscosity of this slurry was adjusted into such a low viscosity that the slurry easily entered the pores of the partition walls. The slurry including alloy particles was held in the pores of the partition walls in the cordierite honeycomb structure by a method similar to a usual aluminum wash coat holding process with respect to a usual wall flow filter, and then dry processing was performed. A thermal capacity changed owing to the phase transformation of this alloy, whereby the thermal capacity of the alloy increased as much as about five times at a temperature exceeding 930° C. Therefore, also owing to the increase of the thermal capacity due to the changes of cordierite and the alumina wash coat slurry itself from room temperature to 930° C., as the thermal capacity of the coated honeycomb structure, a value of 1600 J/kgK was obtained at 930° C., and this value was 2.3 times a value of 700 J/kgK at room temperature.

Any catalyst noble metal was not carried on an alumina coat layer including alloy particles, and a usual coat layer including a noble metal was further carried on this alumina coat layer to prepare a catalytic converter. The noble metal Pt:Rh was mixed in an alumina slurry at a mass ratio of 5:1 to coat the converter. The total amount of the noble metal was set to 3 g per honeycomb structure. The amount of the alumina coat layer including the noble metal was set to 150 g per honeycomb structure.

It is to be noted that the present invention is not limited to the above examples, and a material having a thermal capacity which is largely different from that of a base of cordierite at room temperature and a high temperature may be held on the surfaces of the partition walls of the honeycomb structure, or in the pore of the partition walls.

Comparative Example 1

A catalytic converter was prepared in the same manner as in Example 2 except that any slurry containing alloy particles was not held in the pores of partition walls in the cordierite honeycomb structure of Example 2.

(Durability Test)

The catalytic converters obtained in Examples 1, 2 and Comparative Example 1 were attached right under the exhaust manifold of a gasoline engine having an exhaust air amount of 2 L to perform a GO/Stop durability test. As the conditions of the durability test, a mode was repeated in which idling (an emission temperature of 400° C.) was performed for ten minutes and an operation on maximum rotation number full load conditions (an emission temperature of 1000° C.) was performed for ten minutes. CO, HC and NOx emission tests were performed in an initial stage, after the repetition of 100 cycles, and after the repetition of 200 cycles, respectively. The emission tests were performed by the measurement of the exhaust air amount in an FTP operation mode in conformity to the U.S. regulations. Test results are shown in Table 1. An emission amount is shown as a relative value in a case where the initial emission (g/km) in Comparative Example 1 is regarded as 1.

TABLE 1

|  |  | Initial | After 100 cycles | After 200 cycles |
|---|---|---|---|---|
| Comparative Example 1 | HC emission | 1 | 2.5 | 3.0 |
|  | CO emission | 1 | 2.2 | 2.8 |
|  | NOx emission | 1 | 2.1 | 2.5 |
| Example 1 | HC emission | 1.2 | 1.8 | 1.8 |
|  | CO emission | 1.1 | 1.5 | 1.6 |
|  | NOx emission | 1.4 | 1.6 | 1.7 |
| Example 2 | HC emission | 1.1 | 1.7 | 1.8 |

TABLE 1-continued

|  | Initial | After 100 cycles | After 200 cycles |
|---|---|---|---|
| CO emission | 1.1 | 1.6 | 1.7 |
| NOx emission | 1.3 | 1.5 | 1.7 |

It is seen from Table 1 that, in the case of Examples 1, 2 (which are shown, respectively, as a relative value with respect to the result obtained in Comparative Example 1), the emission values after the repeated durability tests are maintained at a lower level due to less deterioration in purification performance even after the repeated durability tests because the increase in the emission values from the initial emission values was low.

Example 3

A honeycomb structure was prepared using an alloy containing, as components, 17 to 20% of Cr, 5 to 6% of Al, 0.4 to 0.6% of Ti, 0.4 to 0.6% of $Y_2O_3$ and a remainder including Fe and a slight amount of impurities, and this structure was used as a catalyst carrier. This alloy was formed into a foil-like shape, and then provided with waveform unevenness, and this uneven foil and a flat foil were alternately superimposed and wound into a spiral form to prepare a honeycomb having a cylindrical outer periphery. The honeycomb structure having a wall thickness of 3.0 mil (75 μm), a cell density of 600 cpsi (93 cells/cm$^2$), a diameter of 105.7 mm and a length of 114.3 mm was prepared. The thermal capacity of this alloy changed with temperature, and increased as much as about twice at a temperature exceeding 900° C. Therefore, a value of 800 J/kgK was obtained at 900° C., and this value was 2.0 times a value of 400 J/kgK at room temperature. A usual coat layer including a noble metal was carried on the cell wall surfaces of the honeycomb structure made of this alloy to prepare a catalytic converter. The noble metal Pt:Rh was mixed in an alumina slurry at a mass ratio of 5:1 to coat the converter. The total amount of the noble metal was set to 3 g per honeycomb structure. The amount of the alumina coat layer including the noble metal was set to 150 g per honeycomb structure.

Comparative Example 2

A noble-metal-containing coat layer similar to that of Example 3 was carried on a cordierite honeycomb structure having a wall thickness of 3.0 mil (75 μm) and a cell density of 600 cpsi (93 cells/cm$^2$) to prepare a catalytic converter.

(Durability Test)

The catalytic converters obtained in Example 3 and Comparative Example 2 were subjected to the above durability test. Test results are shown in Table 2. It is to be noted that an emission amount is shown as a relative value in a case where the initial emission (g/km) in Comparative Example 2 is regarded as 1.

TABLE 2

|  |  | Initial | After 100 cycles | After 200 cycles |
|---|---|---|---|---|
| Comparative Example 2 | HC emission | 1 | 2.6 | 3.1 |
|  | CO emission | 1 | 2.4 | 2.9 |
|  | NOx emission | 1 | 2.3 | 2.6 |
| Example 3 | HC emission | 1.1 | 1.5 | 1.6 |
|  | CO emission | 1.1 | 1.4 | 1.5 |
|  | NOx emission | 1.3 | 1.6 | 1.7 |

INDUSTRIAL APPLICABILITY

A catalyst carrier according to the present invention is effectively used in any type of industrial field that requires purification of components to be purified included in an exhaust gas, for example, an industrial field such as a car industry, a machine industry or a ceramic industry which requires the purification of the exhaust gas from an internal combustion engine, a burning device or the like.

The invention claimed is:

1. A catalyst carrier which is used for carrying a catalyst thereon, comprising:
   a catalyst carrier having a cordierite honeycomb structure including:
      porous partition walls arranged so that a plurality of cells forming channels for an exhaust gas are formed between two end faces, and
      a coating material layer coating the cordierite honeycomb structure, wherein the coating material layer consists of a zirconium alloy, a chromium alloy, a silicon nitride, or silicon carbide,
   the apparent specific heat of the catalyst carrier when measured at 800° C. is 1.8 times or more greater than the apparent specific heat of the catalyst carrier when measured at room temperature,
   wherein the apparent specific heat means a charge heat amount required for substantially increasing the temperature of a unit mass (kg) by 1 K, inclusive of the influence of endotherm or exotherm caused by change in crystalline form, partial melting, coagulation, phase transformation, vitrification, amorphous-formation, or crystallization.

2. The catalyst carrier according to claim 1, wherein the apparent specific heat at 900° C. is 1.8 times or more greater than that at 200° C.

3. The catalyst carrier according to claim 2, wherein the apparent specific heat at room temperature is 500 J/kgK or more and is less than 900 J/kgK.

4. The catalyst carrier according to claim 1, wherein the cordierite honeycomb structure has an opening ratio (the ratio of the opening area of a plurality of cell holes with respect to a sectional area vertical to an axial direction) of 0.8 or more.

5. The catalyst carrier according to claim 4, wherein the cordierite honeycomb structure further has plugging portions arranged so as to alternately plug one of opening end portions of the cells in the two end faces.

6. The catalyst carrier according to claim 5, wherein the coating material layer is coated on the cordierite honeycomb structure at a ratio of 50 g/l or more, and the apparent specific heat at 900° C. of the catalyst carrier is twice or more greater than that at room temperature.

7. A catalytic converter in which a catalyst is carried on the catalyst carrier according to claim 6.

8. An exhaust gas processing system comprising the catalytic converter according to claim 7.

9. The catalyst carrier according to claim 5, further comprising a layer that is physically or chemically bonded and held in a dispersed state on the surfaces of the partition walls of the cells constituting the cordierite honeycomb structure or in pores, wherein the layer is constituted of a main component of zirconium (Zr), 1 to 1.5 mass % of tin (Sn), 0 to 0.2 mass % of iron (Fe), 0 to 0.2 mass % of chromium (Cr), 0 to 1 mass % of nickel (Ni) and further 0 to 0.02 mass % of oxygen ($O_2$).

10. A catalytic converter in which a catalyst is carried on the catalyst carrier according to claim 9.

11. An exhaust gas processing system comprising the catalytic converter according to claim 10.

12. A catalyst carrier which is used for carrying a catalyst thereon, comprising:
   a catalyst carrier having a honeycomb structure constituted of an alloy containing 17 to 20 mass % of chromium (Cr), 5 to 6 mass % of aluminum (Al), 0.4 to 0.6 mass % of titanium (Ti), 0.4 to 0.6 mass % of yttrium trioxide ($Y_2O_3$) and a remainder including iron (Fe) and a slight amount of impurities, the honeycomb structure including:
      porous partition walls arranged so that a plurality of cells forming channels for an exhaust gas are formed between two end faces, and
      plugging portions arranged so as to alternately plug one of opening end portions of the cells in the two end faces, wherein
   the honeycomb structure has an opening ratio (the ratio of the opening area of a plurality of cell holes with respect to a sectional area vertical to an axial direction) of 0.8 or more;
   the apparent specific heat of the catalyst carrier when measured at 800° C. is 1.8 times or more greater than the apparent specific heat of the catalyst carrier when measured at room temperature;
   wherein the apparent specific heat means a charge heat amount required for substantially increasing the temperature of a unit mass (kg) by 1 K, inclusive of the influence of endotherm or exotherm caused by change in crystalline form, partial melting, coagulation, phase transformation, vitrification, amorphous-formation, or crystallization.

13. A catalytic converter in which a catalyst is carried on the catalyst carrier according to claim 1.

14. An exhaust gas processing system comprising the catalytic converter according to claim 13.

15. A catalytic converter in which a catalyst is carried on the catalyst carrier according to claim 12.

16. An exhaust gas processing system comprising the catalytic converter according to claim 15.

* * * * *